United States Patent
Robinson et al.

(10) Patent No.: US 6,589,038 B1
(45) Date of Patent: Jul. 8, 2003

(54) CONSTANT PRESSURE CASTING HEAD USING VARIABLY DISPLACEABLE CAVITY SURFACE

(75) Inventors: Klaus Robinson, Port Hueneme, CA (US); Matthew T. Sinnott, Newhall, CA (US); Elena Sherman, Culver City, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/494,611

(22) Filed: Jan. 31, 2000

(51) Int. Cl.[7] .............................................. B29C 39/14
(52) U.S. Cl. ...................... 425/145; 425/156; 425/223; 425/224; 118/413; 118/693; 118/694
(58) Field of Search ................................. 425/224, 223, 425/89, 156, 155, 145; 264/212, 213; 118/413, 693, 694

(56) References Cited

U.S. PATENT DOCUMENTS

| | | | | |
|---|---|---|---|---|
| 2,775,257 A | * | 12/1956 | Stirn et al. .................. 137/341 |
| 3,274,319 A | * | 9/1966 | Clegg ......................... 264/126 |
| 3,357,052 A | * | 12/1967 | Vos .............................. 425/71 |
| 3,509,937 A | * | 5/1970 | Radd ........................ 164/479 |
| 3,579,734 A | * | 5/1971 | Mehta ........................ 425/147 |
| 3,600,754 A | * | 8/1971 | Vox ............................. 425/155 |
| 4,680,149 A | * | 7/1987 | Rawlings et al. ............ 264/2.1 |
| 5,229,952 A | * | 7/1993 | Galloway et al. ........... 700/200 |

* cited by examiner

Primary Examiner—Robert Davis
Assistant Examiner—Joseph S Del Sole
(74) Attorney, Agent, or Firm—V. D. Duraiswamy; M. W. Sales

(57) ABSTRACT

A casting head having a variably displaceable cavity surface. The casting head comprises a cavity, at least partially formed by plurality of surfaces, including a carrier surface adjacent the cavity, and a variably displaceable drive surface for controlling a pressure of a viscous casting material in a region proximate the carrier surface. In one embodiment of the invention, the casting head further comprises a doctor blade, disposed proximate the carrier surface, forming a gap therebetween for egress of the casting material. In another embodiment of the casting head, the variably displaceable drive surface is comprised of a piston. The piston is actuated by a driver-controlled motor according to a pre-determined displacement program, or according to the level of the casting material in the cavity.

21 Claims, 10 Drawing Sheets

CONSTANT PRESSURE CASTING HEAD USING VARIABLY DISPLACEABLE CAVITY SURFACE

BACKGROUND OF THE INVENTION

1. Field of the Invention

The present invention relates to systems and methods for casting thin films, and in particular to a casting head using a variably displaceable cavity surface.

2. Description of the Related Art

Precision tape casting machines are designed to produce thin sheets and layered products to precise tolerances. Such casting machines typically use a casting head having a cavity filled with a fluid casting material such as an inorganic powder loaded polymer, or an aqueous slurry. The bottom of the cavity (and hence, the fluid material) is exposed to a carrier film, which is drawn across the casting head. As the carrier film passes the casting head, the fluid material is deposited on the carrier film. The fluid material is then dried, and if necessary, removed from the carrier film. The casting machine includes a rigid structure with a solid, level casting platform that uniformly supports the moving carrier surface.

For production of a high-quality film, the conditioned casting material must be delivered consistently to the surface of the carrier media. This is accomplished by a precision gap provided by an adjustable doctor blade, which is positioned on a precision-ground casting surface certified to tolerances as tight as 0.5 mils. To assure that such machines produce a consistent film, the carrier speed is precisely controlled using a microprocessor-controlled digital drive with electronic and visual monitoring.

In producing high-quality film, it is also important that the casting material be applied to the carrier media with the same pressure. Unfortunately, as the casting process proceeds, the amount of casting material in the casting head is depleted, thus reducing the pressure exerted by the casting material at the carrier media. Since this phenomenon results in undesirable film variability, the casting material in the casting head is replenished.

While this process is effective, it requires the use of a large amount of expensive equipment operating at tight tolerances. Further, this process is inefficient for short casting runs where less than about 100 feet of film is required. Cleaning up the casting machine and disposing of excess casting material can be a lengthy process, requiring the disposal of potentially hazardous waste.

From the foregoing, it can be seen that there is a need for a casting head that does not require the use of expensive equipment. It can further be seen that there is a need for a casting head suitable for application to short casting runs, without consuming excessive casting material or requiring expensive cleanup procedures. The present invention satisfies that need.

SUMMARY OF THE INVENTION

To address the requirements described above, the present invention discloses a casting head having a variably displaceable cavity surface, and a method for using the casting head to produce films.

The casting head comprises a cavity, at least partially formed by plurality of surfaces, including a carrier surface adjacent the cavity, and a variably displaceable drive surface for controlling the pressure of a viscous casting material in a region proximate the carrier surface. In one embodiment of the invention, the casting head further comprises a doctor blade, disposed proximate the carrier surface, forming a gap therebetween for egress of the casting material. In another embodiment of the casting head, the variably displaceable drive surface is comprised of a piston. The piston is actuated by a driver-controlled motor according to a pre-determined displacement program, or according to the level of the casting material in the cavity.

The method comprises the steps of providing a casting material to a casting head cavity having an aperture in fluid communication with the carrier surface, displacing the carrier surface relative to the cavity to deposit the casting material on the carrier surface, and displacing the casting head cavity surface to control a pressure of the casting material in a region proximate to the carrier surface. In one embodiment, this is accomplished by way of a piston, which is displaced so as to maintain the level of casting material in the cavity.

As will be discussed herein, the casting head of the present invention produces significantly better films than prior art casting heads. Further, the casting head of the present invention is more efficient and provides much better film parameter control. The resulting films more precisely match production specification, and can be produced in less time and are more cost effective than films produced with the traditional casting head.

For virtually any size film casting, the constant pressure casting head of the present invention executes the run more quickly and with less wasted casting material. Because much less equipment is required for a casting run with this invention, the cleanup time is cut to a fraction of what it was with the traditional casting head setup and casting material waste is almost nonexistent. Further, the present invention yields more film for the amount of raw material used, thus providing a more reproducible process and provides higher quality castings than the traditional casting methods in use today.

The present invention is easily implemented and is effective for short, medium or any length casting runs. Whenever a new or different slurry loading or slurry composition is required, the present invention allows material waste to be reduced at a minimum and reductions in the costly, labor intensive cleanup process by effectively cutting the costly, labor intensive cleanup time of the complex traditional casting equipment in half. It allows scientists, engineers and technicians to experiment with different casting material mixtures, casting material viscosities and processing parameters at minimal cost to the customer. When a specific length of cast film is required, a complimenting volume of slurry can be tailored to it and our new casting head precisely calibrated for that volume. This can be implemented in less time and executed in significantly less time than the traditional method, saving the time and money. Even if used in production-oriented processes, the present invention allows the performance of sample runs to establish the proper parameters for longer film casting runs without wasting expensive ingredients or spending excessive time on setup and cleanup.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
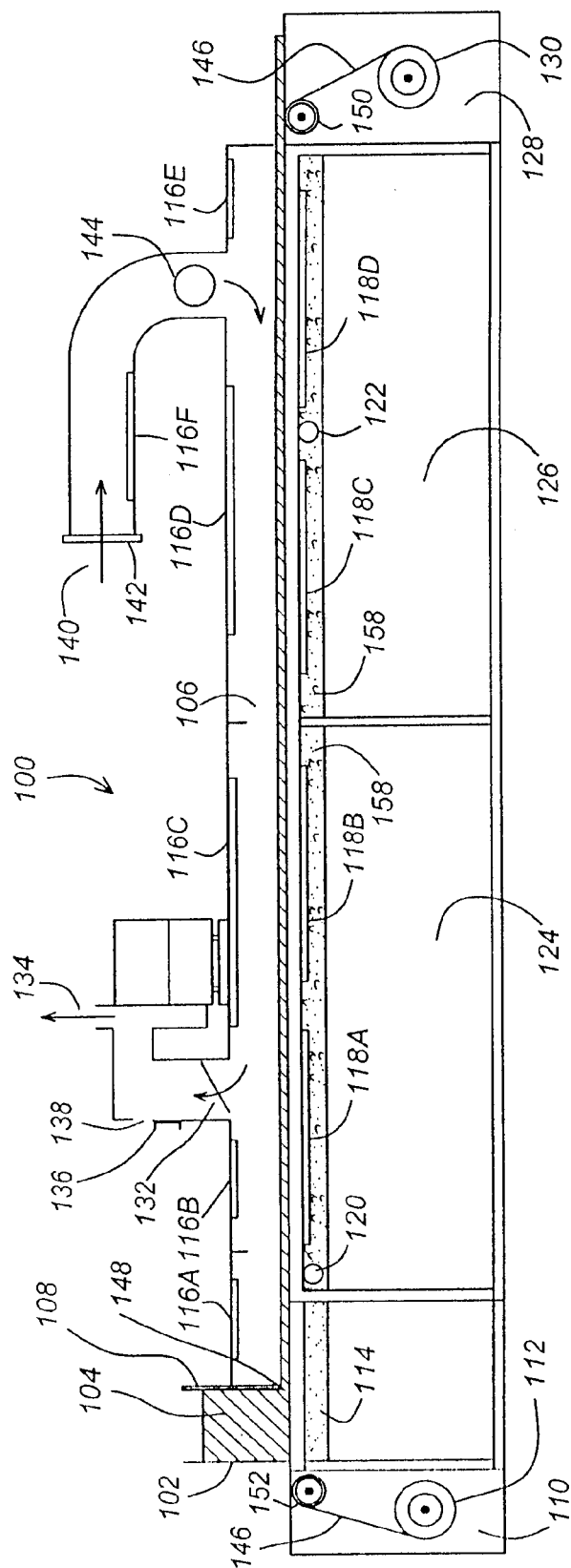
FIG. 1 is a diagram showing an exemplary casting machine.

FIG. 1 is a diagram of a tape casting machine 100. Tape casting machines 100 are designed to produce thin sheets and layered products to precise tolerances using inorganic powder loaded polymers or aqueous slurries. Most casting machines 100 integrate a rigid structure with a solid, level casting platform that uniformly supports a moving carrier 146. The carrier 146 can include, for example, a plastic film such as MYLAR. Conditioned casting material 104 is delivered consistently to the surface of the carrier surface 146 by a casting head 102. Typically, this is accomplished via a precisely set gap 148 provided by an adjustable doctor blade 108 which is positioned on a precision ground casting surface and certified to tolerances as close as 0.05 mils, such as a granite surface plate 114. The gap 148 provides for the egress of the casting material 104. These casting machines 100 produce precisely controlled carrier 146 speeds utilizing a constant speed microprocessor controlled digital drive with electronic and visual monitoring.

The carrier 146 drive includes an exit end assembly 128 having a motor 130 controlled by the digital drive. The motor pulls the carrier 146 across the casting head 102 via a pulley and an exit idler wheel 150. The carrier 146 drive also includes a feed end assembly 110 having a feed idler wheel 152 and brake 112 tension to and position the carrier 146 as required.

To assure properly cured cast tape products, a drying chamber 106 is provided where forced, preheated and filtered air is continuously drawn over the moving tape in a counterflow direction for convective drying, solvent gradient control and exhaust removal. Air enters the drying chamber 106 via intake orifice 140 and an air filter 142. The air filter 142 removes airborne particles that would otherwise contaminate the curing film. Air heater 116F warms the ambient air entering the intake orifice 140. The remaining air heaters 116A–116E warm the air in the drying chamber 106 and also apply heat to the film. The intake manifold includes a thermocouple 144 to measure the temperature of the air entering the drying chamber 106. This data can be used to control the output of air heater 116F (or the remaining air heaters) to a desired value.

After passing over the drying film, the air in the drying chamber is removed via an exhaust orifice 134. Access from the drying chamber 106 to the exhaust orifice is controllable via an exhaust damper 132, which can be opened or closed as desired. A bypass orifice 138, which is controllable by the bypass damper 136, is also provided. Air circulation motor 154 draws air through the drying chamber 106.

The casting machine 100 also includes a first zone heater 124 and a second zone heater 126. The first zone heater 124 optionally comprises one or more sectional under bed heaters 118A and 118B, which are installed below the carrier 146 in temperature controlled zones extending the length of the casting machine 100 to provide even more effective drying to the tape being cast. In one embodiment, these heaters 118A and 118B are heating blankets which are capable of providing approximately five watts per square inch, and are surrounded by insulative material 158. A thermocouple 120 may be provided to monitor the temperature of the carrier and to control the output of the heaters 118A and 118B. Similarly, the second zone heater 126 comprises one or more sectional under bed heaters 118C and 118D, surrounded by insulative material 158 and monitored by a thermocouple 122. The final dry, cured, tape product may be continuously trimmed, slit or stripped from the carrier 146 and collected by various means. The present invention implements a significant change to the casting head 102 of such a typical tape casting machine 100.

Figure 2:
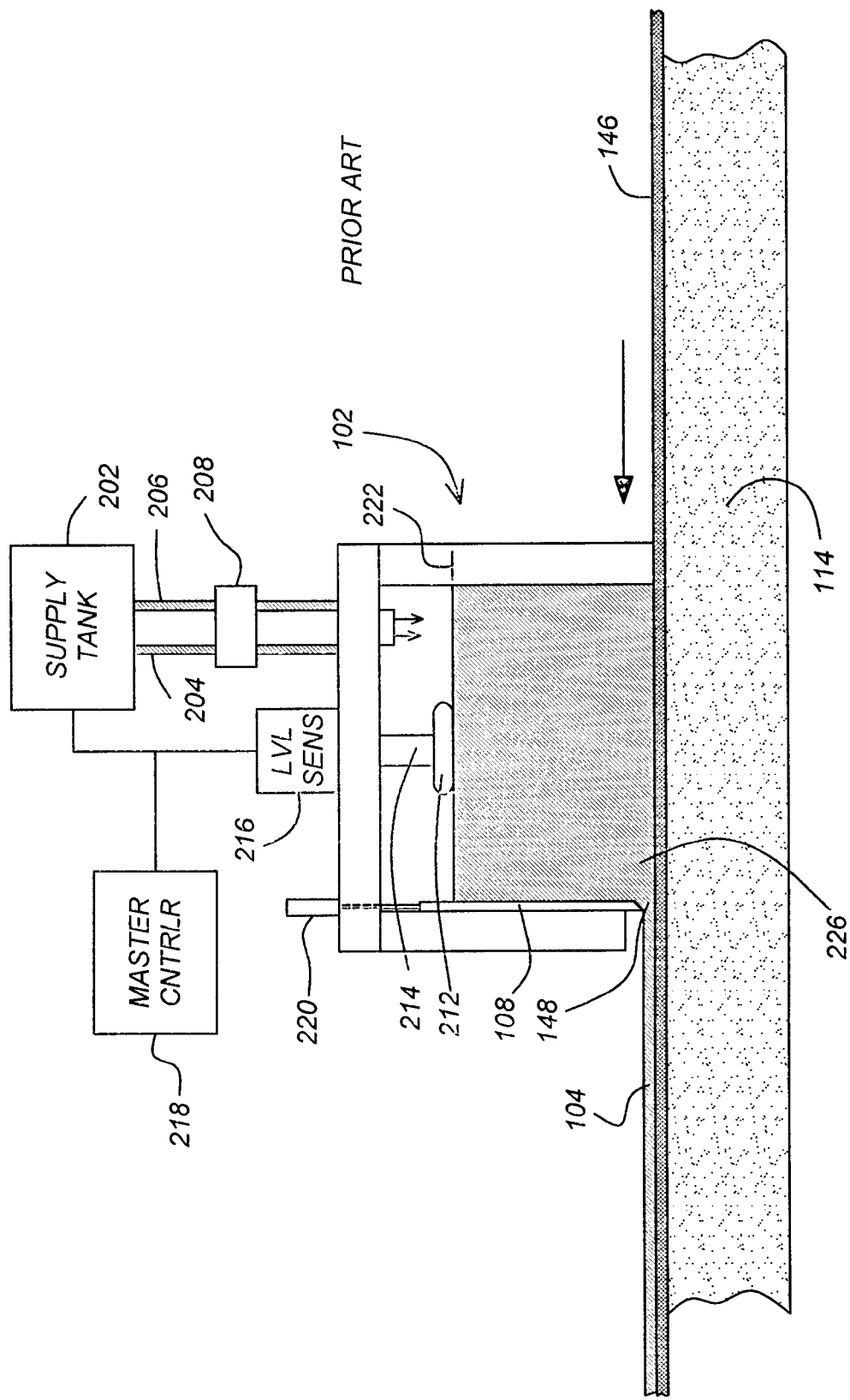
FIG. 2 is a diagram showing an exemplary prior art casting head.

FIG. 2 is a diagram of a conventional casting head 102. Essentially, the casting head 102 comprises fixed dimensioned box with an adjustable doctor blade 108 which sets casting gap 148 at exit of casting head 102. During a typical casting run the casting gap 148 is set by a micrometer adjustment device 220 and then held constant throughout the casting run. As the casting material 104 in the cavity 224 depletes, the level 222 of the casting material 104 is reduced, and the pressure exerted by the casting material 104 in the region 226 proximate the carrier 146 near the casting gap 148 will decrease. This will result in a relative thickness change in the dispensed casting. To address this problem, the casting head cavity 224 is replenished with additional casting material 104 from a separate casting material supply tank 202, as determined by a casting material level sensor 216. The level sensor typically comprises a float 212 coupled to a shaft 214 or other coupling which allows the level sensor 216 to sense the level of the casting material 104.

During a casting run, as the casting material level drops in the casting head cavity 224, the level sensor 216 sends a signal to a master controller 218, providing information indicating that the casting head cavity 224 needs more casting material 104 to maintain a constant level 222. The master controller 218 opens the valve in the casting material distribution head 208 and commences to fill the casting head cavity 224 until the desired level is reached. This process is typically ongoing, and repeated continuously until the casting run is complete.

To maintain a constant viscosity of the casting material 104, the casting material supply tank 202 is equipped with a stirring mechanism, which is typically driven by an electric motor. The casting material supply tank 202 is also heated and held to a preset temperature by an electronic controller and power supply. Typically, feeder lines 204 and 206 to the casting head 102 are also heated and kept at a constant temperature. An overwhelming amount of equipment is needed to sustain such a casting run and this becomes especially prohibitive when only 100 feet or less of cast film are desired. The very involved equipment cleanup process can become an immense task and requiring excessive effort. An inordinate amount of material is wasted when the empty casting material supply tank 202 empties and can no longer maintain the desired constant casting material level 222 in the casting head cavity 224. As the casting material level 222 drops in the casting head 102, so does the pressure at the dispensing gap 148. The result is an undesirable, tapered casting and a considerable amount of wasted material.

Figure 3:
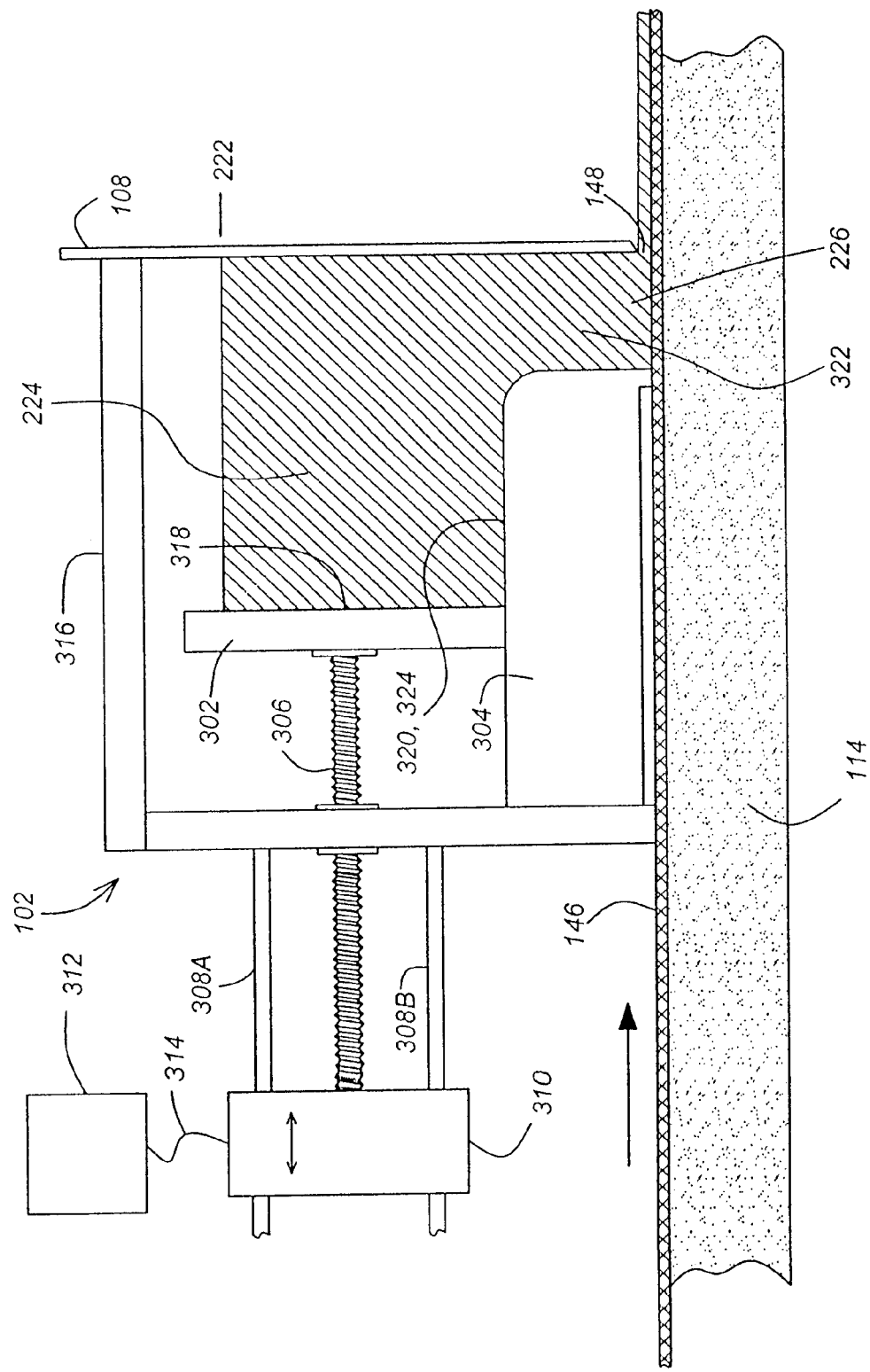
FIG. 3 is a diagram showing one embodiment of the present invention.

FIG. 3 is a diagram presenting one embodiment of the casting head 102 of the present invention. The illustrated casting head 102 no longer requires (but can still use) a float 212 and level sensor 216, a master controller 218, or a pressured casting material supply tank 202 with variable speed agitators and controlled heating. It also has no need for a temperature controlled casting material supply line 204, 206 or casting material distribution head 208 to cast a high quality, uniformly thick cast film.

In one embodiment of the present invention, the casting head 102 comprises a computer controlled, constant level, constant temperature, large volume casting head 102 that need only be filled with casting material 104 one time per casting. The casting head 102 maintains a constant casting material level 222 throughout the casting run. This is accomplished by incorporating a variably displaceable drive surface 318 into one of the cavity 224 surfaces. This surface allows the pressure of the casting material 104 in the region 226 proximate to the adjacent carrier 146 surface, including the gap 148, to be controlled to remain at a desired value by regulating the level 222 of the casting material 104 during the process.

The drive surface 318 can be displaced by a motor 310 such as a stepper motor. In the illustrated embodiment, the drive surface 318 is provided by an articulating back wall, such as can be provided by a piston 302 driven via a lead screw shaft 306 and transmission. The piston 302 can be fabricated out of almost any kind of material. In one embodiment, the piston is fabricated of a slippery, substantially inert and easy to clean plastic material such as TEFLON. In one embodiment, the motor 310 is a stepper motor which is supported by ways 308A and 308B, and the controller 312 comprises a programmable power supply. The stepper motor 310 drives a 40-pitch lead screw 306 to drive the piston 302. Alternatively, the stepper motor may be fixed to the piston 302, and travel along the ways 308A and 308B to displace the piston 302 as required.

Other embodiments of the variably displaceable drive surface are possible, and are within the scope of the present invention. For example, the variably displaceable drive surface can comprise a flexible surface which is driven by a device providing motive force such as electromechanical motor (including for example, a voice coil or ribbon motor) or a pneumatically or hydraulically actuated device. As can be seen from the foregoing, the present invention can be practiced with almost any kind of motor drive or even hand cranking. The scope of the invention is thus intended to include a cavity 224 with any surface which is variably displaceable to control the level of the casting material, and hence the pressure of the casting material near the gap 148.

In one embodiment, the stepper motor 310 is controlled by a computer-controlled driver 312, which is programmed to run according to a pre-determined (before the casting run) program. In this embodiment, the displacement position of the piston 302 as a function of time (or in simple cases, a constant displacement speed) is determined by a controller 312 and communicated to the motor 310 by a flexible wire 314. The preset program can include a dynamically changing piston speed or may simply comprise a constant piston displacement speed. By controlling the piston 302 motion, the casting material 104 and therefore the pressure near the gap 148 can be accurately controlled. The piston 302 displacement is determined to maintain a constant casting material level 222 in the casting head 102 in harmony with the casting material 104 being dispensed onto the (e.g. MYLAR) carrier 146 for a specified casting.

In one embodiment, a bottom surface 320 of the cavity 224 is provided by a casting head bottom portion 304. The casting head bottom 304 is sized so as to form an aperture 322 between itself and the doctor blade 108. Casting material passes through the aperture 322 to be deposited on the carrier surface 146. In this embodiment, the casting head bottom 304 assures that the surface area of the carrier material 146 exposed to the casting material 104 remains constant as the piston 302 moves during the casting run. Optionally, the bottom surface 320 comprises a heating surface 324 to control the temperature of the casting material 104.

Figure 4:
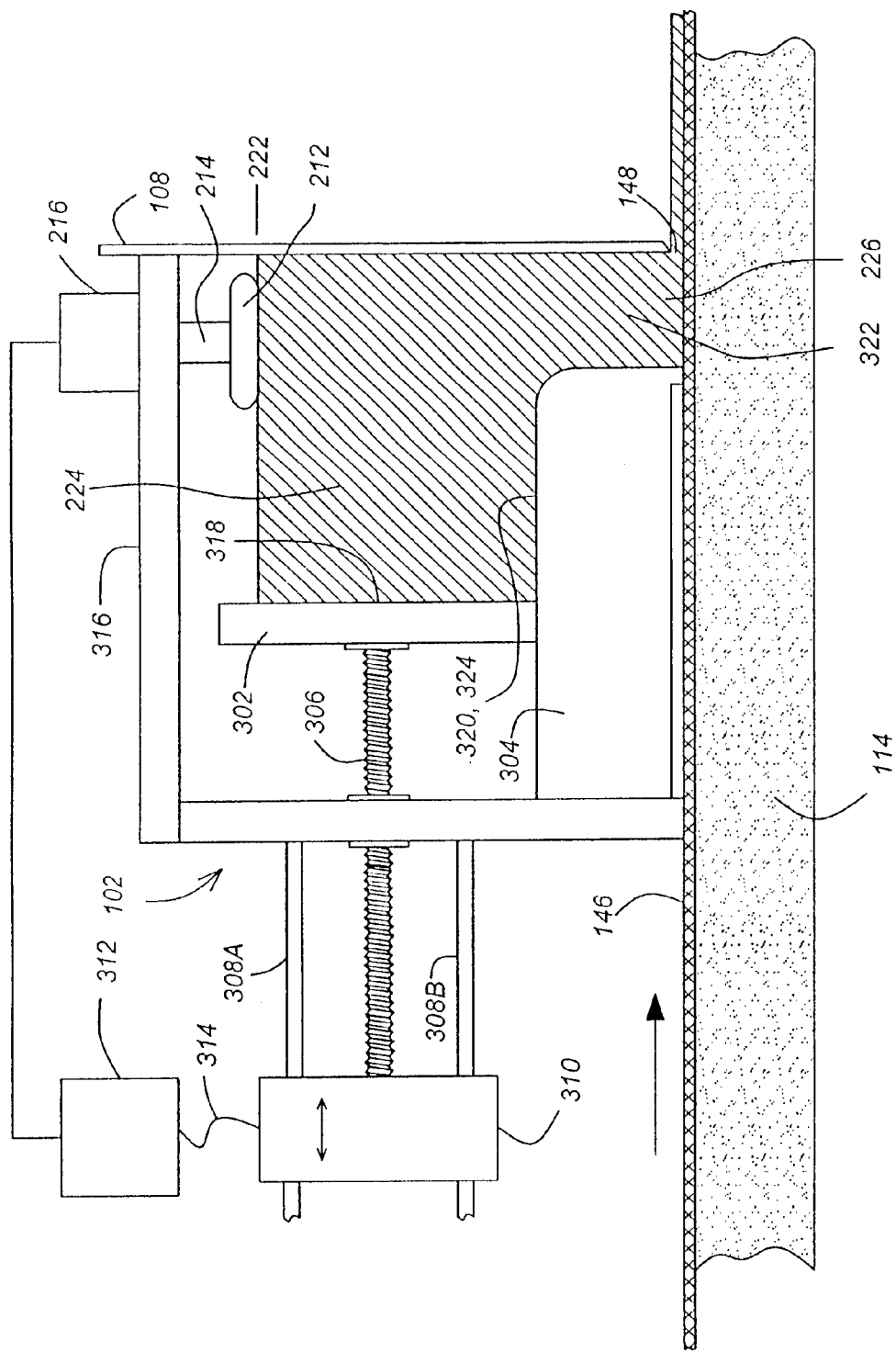
FIG. 4 is a diagram showing a second embodiment of the present invention using casting material level feedback.

FIG. 4 is a diagram of another embodiment of the casting head 102 in which the casting material level 222 is measured by a level sensor 216 and associated float 212 and shaft 214. This information can be fed back from the level sensor 216 to the controller 312 in the manner of a closed loop feedback control system to provide commands to the motor 310 to adjust the piston 302 position as required.

The displacement program for the piston 302 is largely determined by the viscosity of our casting material 104 and the size of the gap 148 of the doctor blade 108. The viscosity of the casting material 104 determines the density of the resulting cast tape and the gap 148 setting of the doctor blade 108 determines the final thickness of the cast tape. Once the proper piston speed (that which maintains a constant slurry level) is determined (e.g. by experimentation or computation), no further changes are required for the remainder of any casting run.

Some casting materials 104 are so viscous that a float cannot easily determine their level 222 in the cavity 224. In the past, this has required the use of a laser level sensor. In such circumstances, the embodiment of the present invention using a pre-determined piston displacement program is especially desirable.

In one embodiment of the present invention, provision is made by a transparent cover 316 such as a view plate 316 constructed of a non-opaque thermal glass or similar material, to visually monitor the casting material level 222 in the casting head 102. If the casting material level 222 should rise or fall during a casting run, the controller 312 allows the piston speed to be manually altered during that run, thereby allowing a casting material level 222 to be maintained.

Further, where newly formulated casting material 104 is used, the transparent cover 316 can be used with a hand-operated controller that allows the user to control the view of the casting material level 222 and change the speed, in small increments, as necessary to maintain a constant slurry level in the casting head 102. After each casting run with a newly formulated casting material 104, data from that run can be used to calculate and set the proper piston 302 displacement program for any specific casting material 104 formulation and casting material 104 viscosity on any follow up casting run.

By eliminating the float 212, level sensor 216, master controller 218, temperature controlled casting material supply tank 202 with it's electric stirring mechanism, the temperature controlled casting material feed lines 204 and 206 and the casting material distribution head 208, the casting machine 100 has been substantially simplified, eliminating modules that consume a significant amount of casting material, including the material lost by the fixed dimensioned casting box. This extra hardware requires many added hours of cleanup time and the accompanying electronics require constant tuning and calibration. Instead of implementing a casting run every other day, the present invention allows users to perform one run per day comfortably and two runs per day if absolutely necessary.

Figure 5:
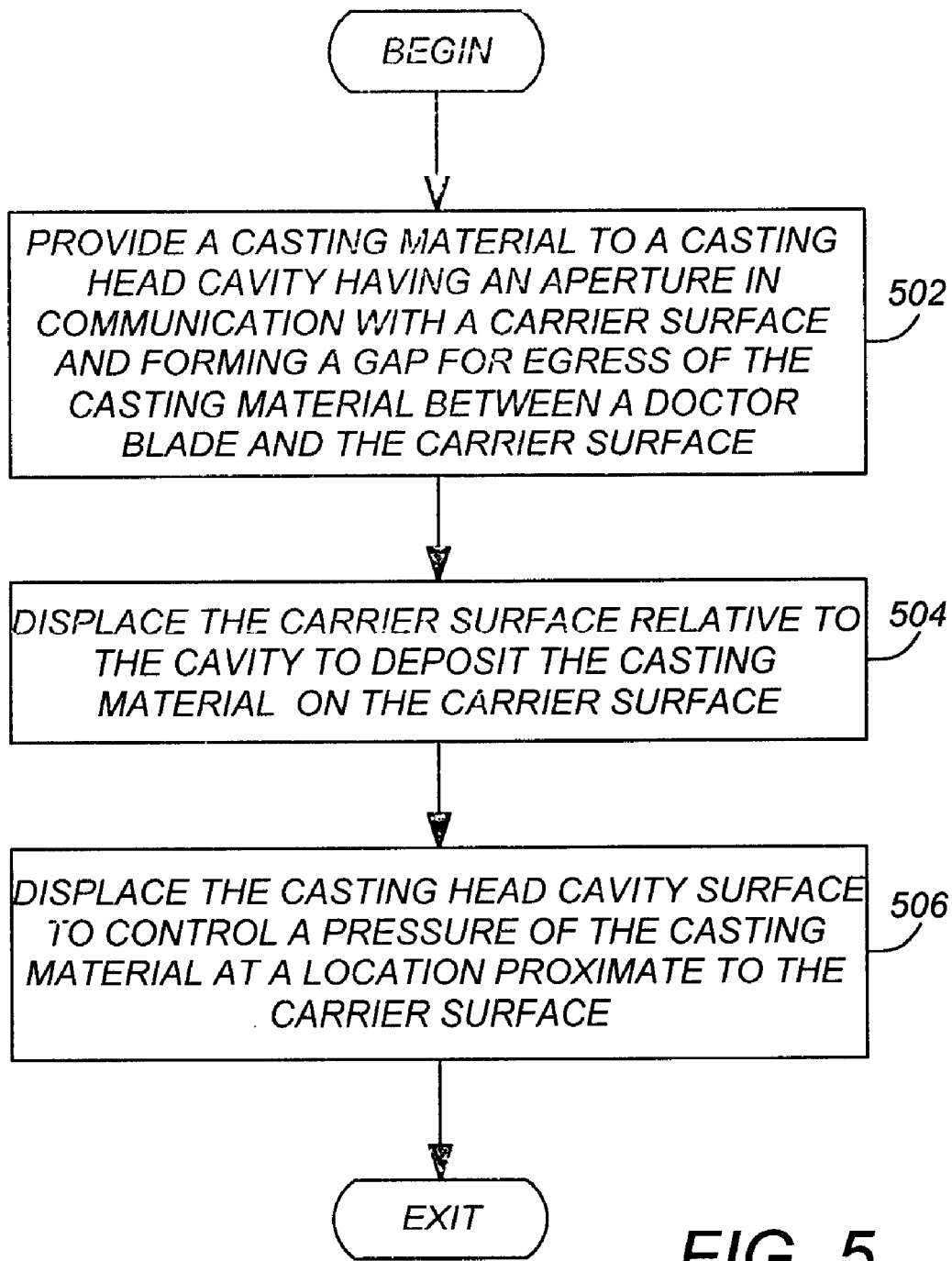
FIG. 5 is a flow chart showing exemplary process steps usable to practice one embodiment of the present invention.

FIG. 5 is a flow chart presenting illustrative process steps used to practice one embodiment of the present invention. A casting material 104 is provided to the casting head 102 having an aperture 322 in communication with a carrier 146 surface and forming a gap 148 for egress of the casting material 104, as shown in block 502. The carrier surface is displaced 504 relative to the cavity 224 to deposit the casting material 104 on the carrier 146 surface. A casting head cavity interior surface 318 is then displaced 506 to control the pressure of the casting material in a region 226 proximate the carrier 146 surface, including the gap 148. To maintain uniformity of the resulting film, the steps of displacing the carrier surface and displacing the cavity 224 interior surface 318 are performed substantially simultaneously.

The present invention has proven to produce high quality tape castings. Casting runs were performed using a prior art casting head with the present invention, and the results compared. In these casting runs, cast films were harvested at the exit of the casting machine 100 with a hand operated, roller-type cutting device. Each cut off section of cast film was between approximately 13 inches and 14 inches long and about 13 inches wide.

Figure 6:
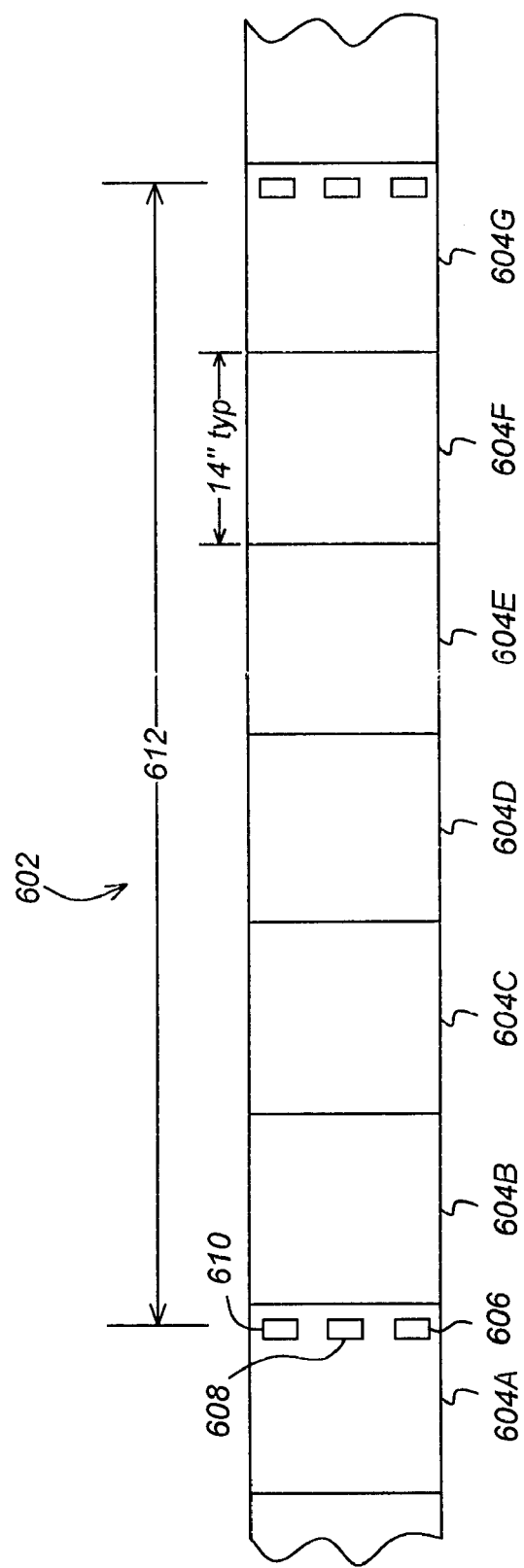
FIG. 6 is a diagram showing a typical cast film.

FIG. 6 is a diagram showing a typical cast film 602. To determine the uniformity of the cast film 602, the cast film was cut into sheets 604A–604G, samples were cut out of the cast film 602, and a 1 inch ×2⅛ inch die block was used to obtain samples from the center 608 and each edge 606 and 610 of the cast film 602. The length l 612 of cast film 602 between each set of sample points was varied from run to run but was kept constant for each specific run. Three separate, 1¾ inch by 2⅛ inch cut-film samples were weighed to determine each data point. A first sample was taken from the center 608 of the 13 inch width and the other two samples 606 and 610 were taken 1½ inches from the edge of the 13 inch wide cut film. Each sample was taken every n equal-length sheets of the total length of the specific casting run. Hence, the length l 612 of the cast film 602 between sampling points varied from run to run and was determined by the total length of film cast 602 in each casting run. On relatively long casting runs, the film was sampled every 10 sheets.

FIGS. 7–10 are diagrams showing the results of the foregoing casting runs.

Figure 7:
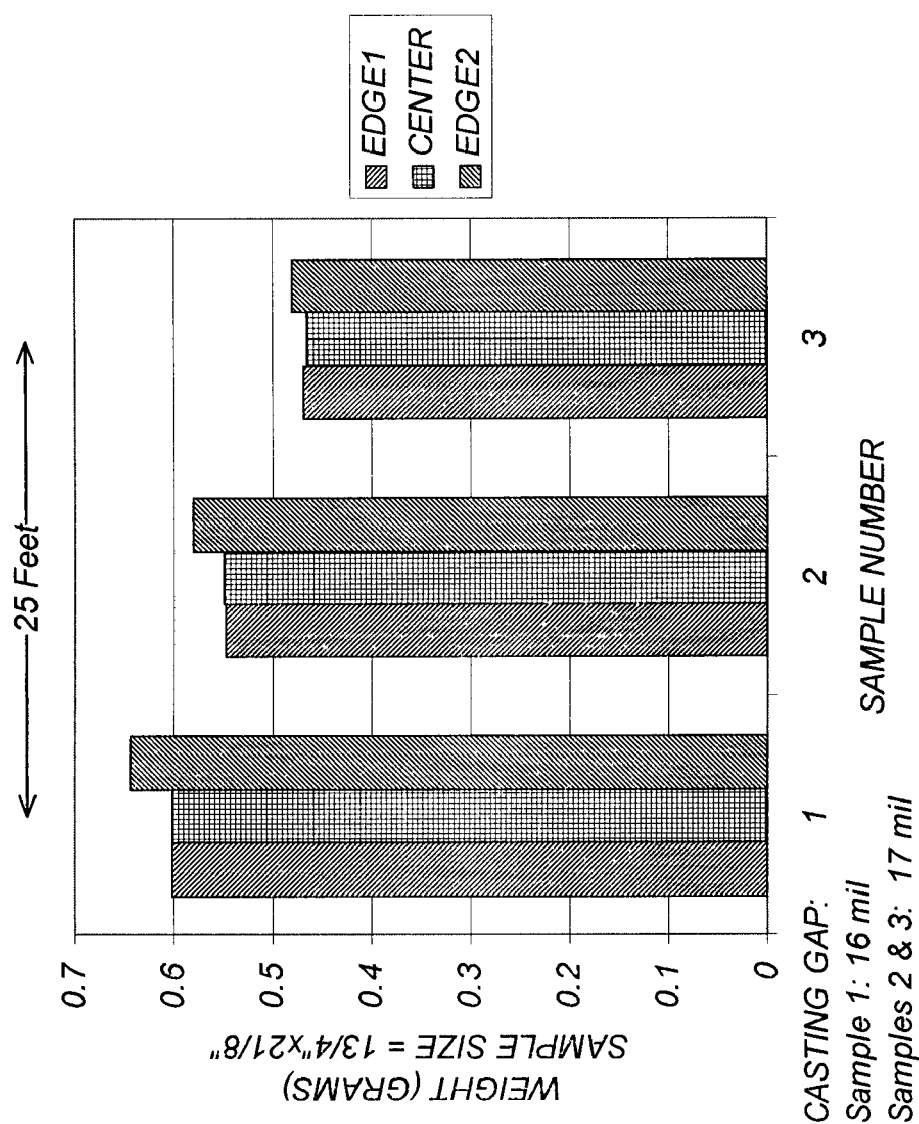
FIGS. 7–10 are diagrams showing the results of cast film tests.

FIG. 7 is a diagram showing the results using a prior art casting head 102 for a 25 foot casting run, using a casting gap 148 between 16 and 17 mil.

Figure 8:
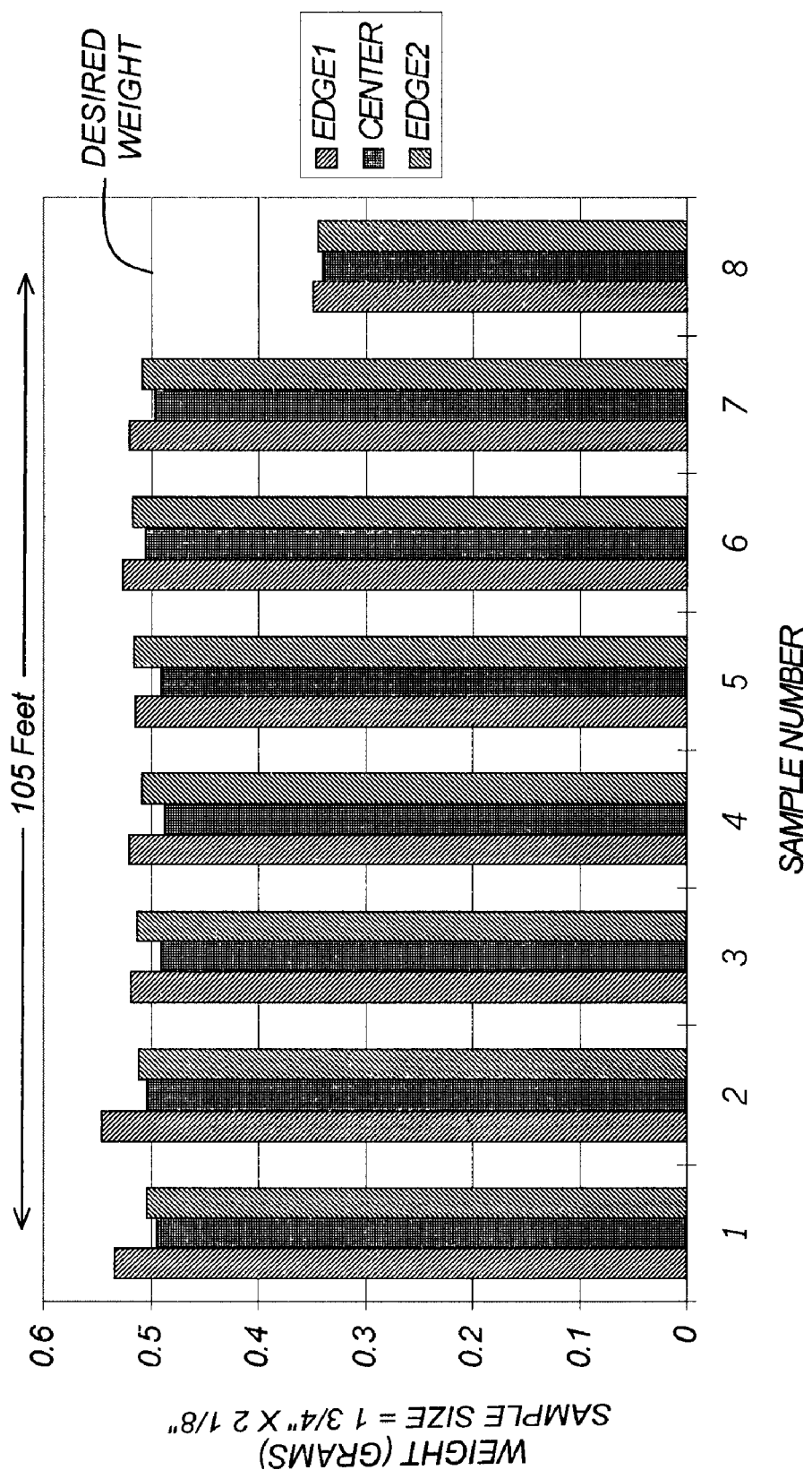

FIG. 8 is a diagram showing the results using the casting head of the present invention for a 105 foot casting run, using the same casting gap 148. In this case, the desired weight of each of the samples is 0.5 grams. Note that the samples show good edge to edge consistency and repeatability from sheet to sheet.

Figure 9:
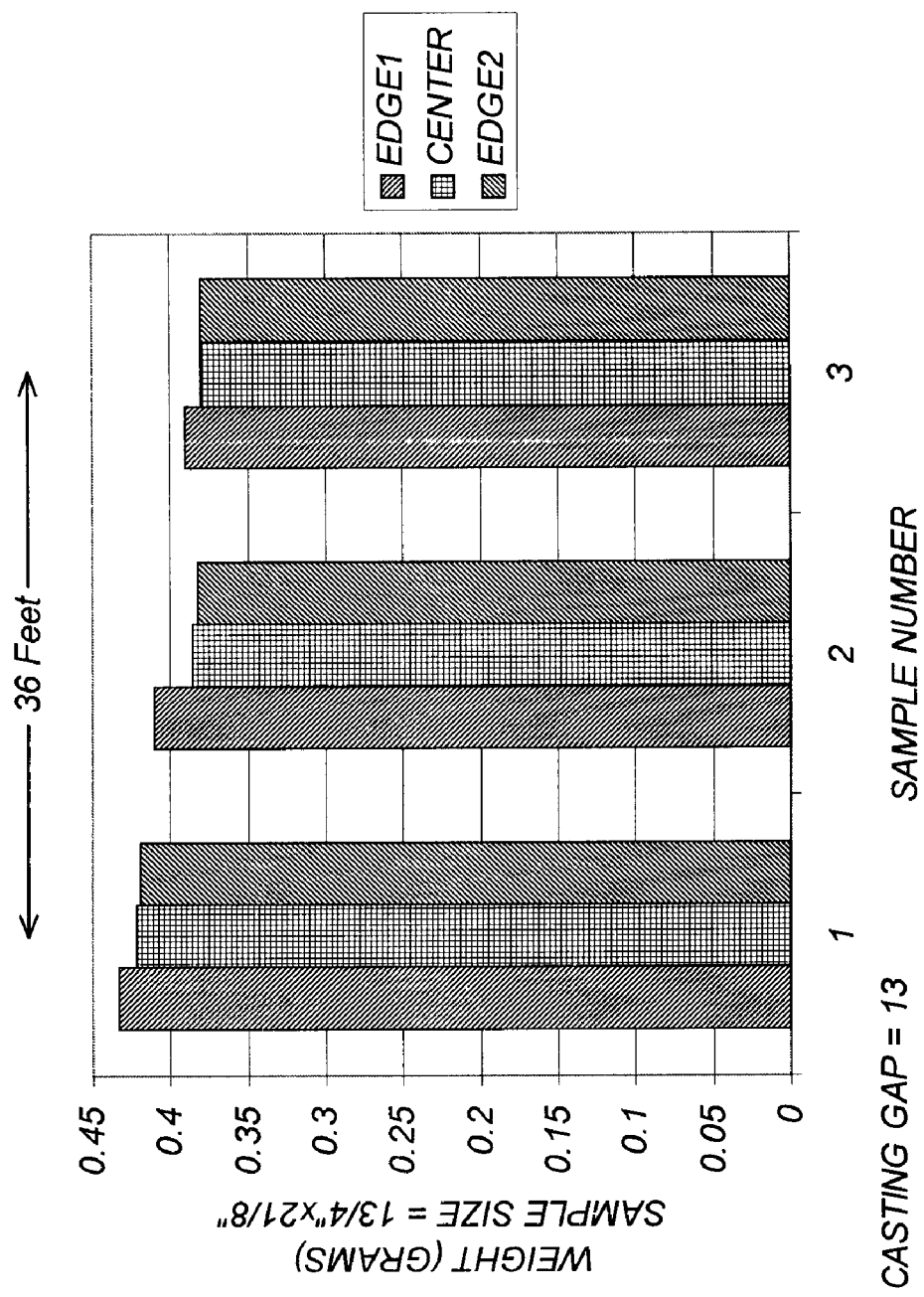

FIG. 9 is a diagram showing the results for a 13 mil casting gap and a 36 foot casting run using a prior art casting head 102.

Figure 10:
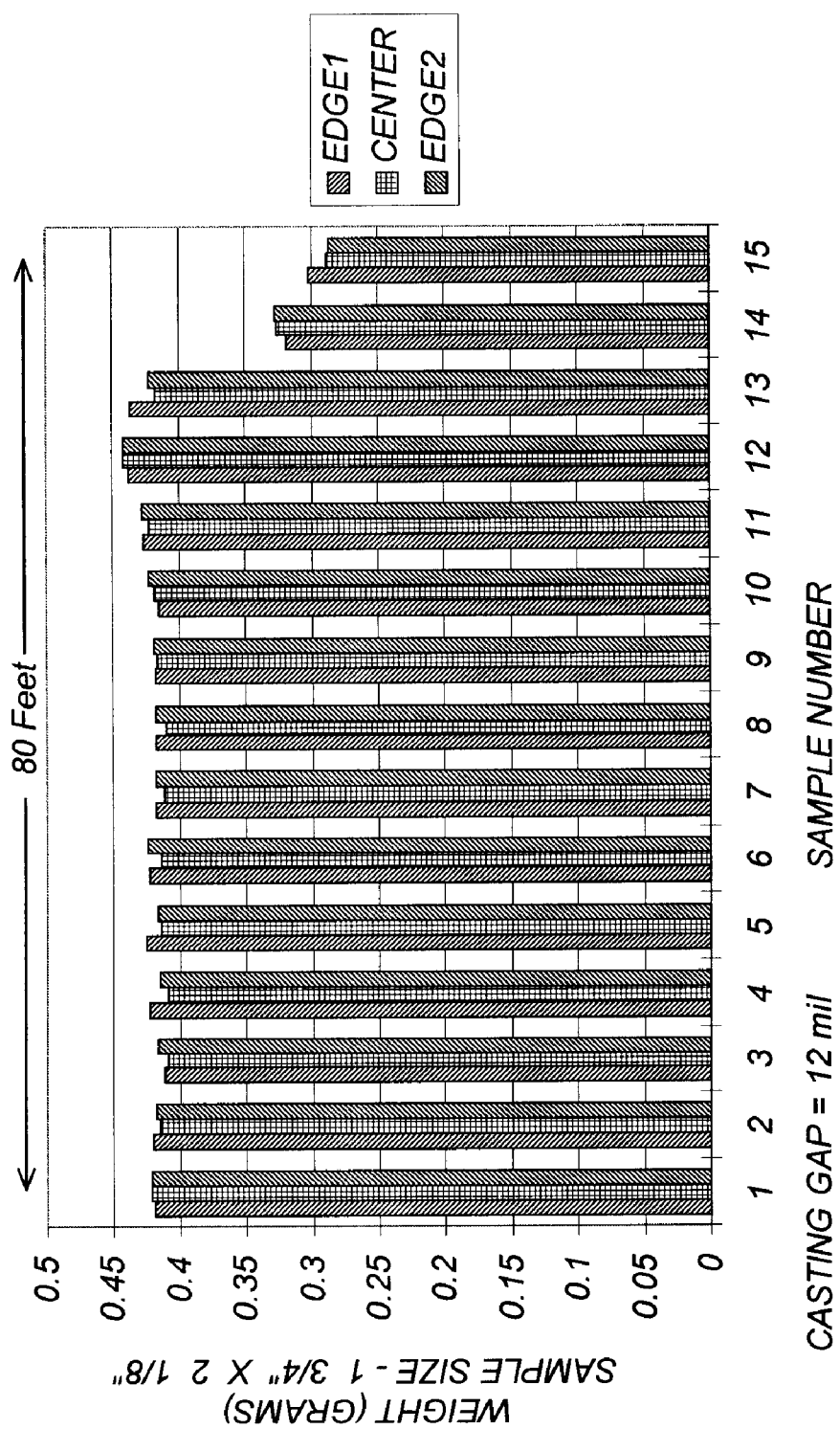

FIG. 10 is a diagram showing the test results for an 80 foot casting run using the casting head of the present invention with a casting gap of approximately 12 mil.

CONCLUSION

This concludes the description of the preferred embodiments of the present invention. In summary, the present invention describes a casting head having a variably displaceable cavity surface, and a method for using the casting head to produce films.

The casting head comprises a cavity, at least partially formed by plurality of surfaces, including a carrier surface adjacent the cavity, and a variably displaceable drive surface for controlling a pressure of a viscous casting material in a region proximate the carrier surface. In one embodiment of the invention, the casting head further comprises a doctor blade, disposed proximate the carrier surface, forming a gap therebetween for egress of the casting material. In another embodiment of the casting head, the variably displaceable drive surface is comprised of a piston. The piston is actuated by a driver-controlled motor according to a pre-determined displacement program, or according to the level of the casting material in the cavity.

The method comprises the steps of providing a casting material to a casting head cavity having an aperture in fluid communication with the carrier surface, displacing the carrier surface relative to the cavity to deposit the casting material on the carrier surface, and displacing the casting head cavity surface to control a pressure of the casting material in a region proximate to the carrier surface. In one embodiment, this is accomplished by way of a piston which is displaced so as to maintain the level of casting material in the cavity.

The foregoing description of the preferred embodiment of the invention has been presented for the purposes of illustration and description. It is not intended to be exhaustive or to limit the invention to the precise form disclosed. Many modifications and variations are possible in light of the above teaching.

For example it is envisioned that the principles of the present invention can be used in conjunction with prior art methods of refilling the casting head cavity. This embodiment would provide higher bandwidth control over the level, thus promoting greater uniformity, or allowing other elements, such as the supply tank 202 and casting material distribution head 208 to be controlled by a lower bandwidth loop than would otherwise be required.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A casting head, comprising:
    a cavity, at least partially formed by a plurality of surfaces, including:
        an adjacent carrier surface for carrying a casting material from the cavity; and
        a variably displaceable drive surface distinct from the carrier surface and variably displaceable to change a dimension of the cavity for regulating a level of the casting material in the cavity to control a pressure of the casting material in a region proximate the carrier surface.

2. The apparatus of claim 1, further comprising a doctor blade disposed proximate the carrier surface, forming a gap therebetween for egress of the casting material.

3. The apparatus of claim 1, further comprising a motor coupled to the drive surface, the motor for displacing the drive surface in an amount to compensate for the egress of the casting material to maintain a substantially constant casting material level.

4. The apparatus of claim 3, further comprising a driver, for controlling the motor to displace the drive surface according to a predetermined program.

5. The apparatus of claim 1, further comprising:
a sensor for measuring the level of the casting material;
a driver, for controlling a motor to displace the drive surface according to the measured level of the casting material.

6. The apparatus of claim 1, wherein the variably displaceable surface is at least partially formed by a piston, and the apparatus further comprises:
a motor, coupled to the piston;
a driver, for controlling the motor.

7. The apparatus of claim 6, wherein the driver controls the motor to displace the drive surface according to a predetermined program.

8. The apparatus of claim 6, further comprising a sensor for measuring the level of the casting material, and wherein the driver controls the motor to displace the drive surface according to the measured level of the casting material.

9. The apparatus of claim 6, wherein the plurality of surfaces further comprises a bottom surface, disposed between the piston and the carrier surface.

10. The apparatus of claim 9, further comprising a doctor blade disposed proximate the carrier surface, forming a gap therebetween for egress of the casting material, wherein the bottom surface and the doctor blade form an aperture therebetween exposing the casting material to the carrier surface.

11. The apparatus of claim 9, wherein the bottom surface is heated to control the temperature of the casting material.

12. The apparatus of claim 1, wherein the plurality of surfaces further comprises a heating surface, for controlling the temperature of the casting material.

13. A casting head, comprising:
a cavity, at least partially form by a plurality of surfaces, including:
an adjacent carrier surface for carrying a casting material from the cavity; and
a variably displaceable drive surface distinct from the carrier surface for regulating a level of the casting material in the cavity to control a pressure of the casting material in a region proximate the carrier surface; and
a motor coupled to the drive surface, the motor for displacing the drive surface in an amount to compensate for the egress of the casting maternal to maintain a substantially constant casting material level.

14. The apparatus of claim 13, further comprising a driver, for controlling the motor to displace the drive surface according to a predetermined program.

15. A casting head, comprising:
a cavity, at least partially formed by a plurality of surfaces, including:
an adjacent carrier surface for carrying a casting material from the cavity; and
a variably displaceable drive surface distinct from the carrier surface for regulating a level of the casting material in the cavity to control a pressure of the casting material in a region proximate the carrier surface; and
a sensor for measuring the level of the casting material; and
a driver, for controlling a motor to displace the drive surface according to the measured level of the casting material.

16. A casting head, comprising:
a cavity, at least partially formed by a plurality of surfaces, including:
an adjacent carrier surface for carrying a casting material from the cavity; and
a variably displaceable drive surface distinct from the carrier surface for regulating a level of the casting material in the cavity to control a pressure of the casting material in a region proximate the carrier surface wherein the variably displaceable surface is at least partially formed by a piston; and
a motor, coupled to the piston; and
a driver, for controlling the motor.

17. The apparatus of claim 16, wherein the driver controls the motor to displace the drive surface according to a predetermined program.

18. The apparatus of claim 16, further comprising a sensor for measuring the level of the casting material, and wherein the driver controls the motor to displace the drive surface according to the measured level of the casting material.

19. The apparatus of claim 16, wherein the plurality of surfaces further comprises a bottom surface, disposed between the piston and the carrier surface.

20. The apparatus of clam 19, further comprising a doctor blade disposed proximate the carrier surface, forming a gap therebetween for egress of the casting material, wherein the bottom surface and the doctor blade form an aperture therebetween exposing the casting material to the carrier surface.

21. The apparatus of claim 19, wherein the bottom surface is heated to control the temperature of the casting material.

* * * * *